(12) United States Patent
Houha et al.

(10) Patent No.: US 11,836,558 B2
(45) Date of Patent: Dec. 5, 2023

(54) GRAMOPHONE PLATE WITH RECORDED IMAGE

(71) Applicant: IQ STRUCTURES S.R.O., Husinec-Rez (CZ)

(72) Inventors: Roman Houha, Prague-Branik (CZ); Marek Skeren, Nova Ves I (CZ); Milan Kveton, Prague (CZ); Milan Matejka, Brno (CZ)

( * ) Notice: Subject to any disclaimer, the term of this patent is extended or adjusted under 35 U.S.C. 154(b) by 0 days.

(21) Appl. No.: 17/269,065

(22) PCT Filed: Aug. 8, 2019

(86) PCT No.: PCT/EP2019/071378
§ 371 (c)(1),
(2) Date: Feb. 17, 2021

(87) PCT Pub. No.: WO2020/038733
PCT Pub. Date: Feb. 27, 2020

(65) Prior Publication Data
US 2021/0209432 A1    Jul. 8, 2021

(30) Foreign Application Priority Data
Aug. 20, 2018  (GB) ..................... 1813519

(51) Int. Cl.
*G06K 19/06*  (2006.01)
*G11B 3/78*  (2006.01)

(52) U.S. Cl.
CPC . *G06K 19/06065* (2013.01); *G06K 19/06103* (2013.01); *G06K 19/06121* (2013.01); *G11B 3/78* (2013.01)

(58) Field of Classification Search
CPC ....... G06K 19/06065; G06K 19/06103; G06K 19/06121; G06K 19/16; G06K 2019/0629; G11B 3/78
See application file for complete search history.

(56) References Cited

U.S. PATENT DOCUMENTS

| 964,686 | A |   | 7/1910  | Owen |          |
|---------|---|---|---------|------|----------|
| 1,033,909 | A | * | 7/1912 | Owen | G11B 7/24 |
|         |   |   |         |      | 40/340   |
| 1,477,117 | A | * | 12/1923 | Gleason | G09F 7/00 |
|         |   |   |         |      | 283/117  |
| 3,404,224 | A | * | 10/1968 | Revelo | H04N 5/85 |
|         |   |   |         |      | 352/37   |

(Continued)

FOREIGN PATENT DOCUMENTS

| GB | 1597843   | 9/1981 |
|----|-----------|--------|
| JP | S4924573  | 3/1974 |
| JP | 2000149257| 5/2000 |

OTHER PUBLICATIONS

Intellectual Property Office, Search Report, App. No. GB1813519.4 (dated Jan. 17, 2020).

(Continued)

*Primary Examiner* — Daniel I Walsh
(74) *Attorney, Agent, or Firm* — Walters & Wasylyna LLC

(57) ABSTRACT

A gramophone plate (P) having at least one face, the at least one face including at least one region on which is recorded audio data (2), wherein the said at least one region of the at least one face also has at least one visual image (7), or a portion of at least one visual image, recorded thereon.

15 Claims, 2 Drawing Sheets

(56) References Cited

U.S. PATENT DOCUMENTS

| | | | | | |
|---|---|---|---|---|---|
| 3,687,769 | A | * | 8/1972 | Dague | B32B 27/306 |
| | | | | | 156/219 |
| 3,716,286 | A | * | 2/1973 | St. John | G03H 1/10 |
| | | | | | 369/103 |
| 3,717,407 | A | * | 2/1973 | Dimitracopoulos | G03B 31/06 |
| | | | | | 369/69 |
| 3,720,005 | A | * | 3/1973 | Roche | G09B 7/08 |
| | | | | | 353/19 |
| 3,770,886 | A | * | 11/1973 | Kiemle | G11B 7/0065 |
| | | | | | 369/111 |
| 3,813,685 | A | * | 5/1974 | St. John | H04N 5/89 |
| | | | | | 359/30 |
| 3,829,610 | A | * | 8/1974 | Meeussen | G03B 31/00 |
| | | | | | 369/111 |
| 3,900,884 | A | * | 8/1975 | St. John | H04N 5/89 |
| | | | | | 359/22 |
| 4,007,481 | A | * | 2/1977 | St. John | H04N 9/82 |
| | | | | | 359/22 |
| 4,021,606 | A | * | 5/1977 | Takeda | G11B 7/0065 |
| 4,066,268 | A | * | 1/1978 | Borchard | B41J 3/4071 |
| | | | | | 369/287 |
| 4,084,185 | A | * | 4/1978 | de Lang | G11B 7/24085 |
| | | | | | 369/44.37 |
| 4,089,598 | A | * | 5/1978 | Meyer | G03B 31/06 |
| | | | | | 353/101 |
| 4,118,287 | A | * | 10/1978 | Dewallens | G11B 23/40 |
| | | | | | 216/33 |
| 4,144,300 | A | * | 3/1979 | Breeden | G11B 23/40 |
| | | | | | 264/494 |
| 4,224,480 | A | * | 9/1980 | Satoh | G11B 7/0065 |
| 4,277,071 | A | * | 7/1981 | Birt | G11B 23/38 |
| | | | | | 369/84 |
| RE30,723 | E | * | 8/1981 | Heine | G11B 7/14 |
| | | | | | 369/18 |
| 4,295,162 | A | * | 10/1981 | Carlsen | G03H 1/26 |
| | | | | | 369/111 |
| 4,317,131 | A | * | 2/1982 | Jerome | G11B 20/00007 |
| | | | | | 369/120 |
| 4,420,829 | A | * | 12/1983 | Carlson | G03H 1/26 |
| | | | | | 365/125 |
| 4,431,487 | A | * | 2/1984 | Weaver | C25D 1/10 |
| | | | | | 204/281 |
| 4,967,286 | A | * | 10/1990 | Nomula | G11B 23/40 |
| | | | | | 386/326 |
| 5,189,531 | A | * | 2/1993 | Palmer | A45D 33/18 |
| | | | | | 215/230 |
| 5,398,231 | A | * | 3/1995 | Shin | G11B 7/24 |
| 5,550,603 | A | * | 8/1996 | Yoshimura | G11B 27/30 |
| | | | | | 352/37 |
| 5,581,530 | A | * | 12/1996 | Iizuka | H04N 5/9206 |
| | | | | | 386/E5.013 |
| 5,587,984 | A | | 12/1996 | Owa et al. | |
| 5,607,188 | A | | 3/1997 | Bahns et al. | |
| 5,751,398 | A | * | 5/1998 | Beard | G11B 20/1261 |
| | | | | | 352/37 |
| 5,751,671 | A | * | 5/1998 | Koike | G11B 19/04 |
| | | | | | 369/84 |
| 6,507,557 | B1 | * | 1/2003 | Ohno | G11B 7/24094 |
| | | | | | 369/103 |
| 6,986,150 | B2 | * | 1/2006 | Spruit | G11B 20/00086 |
| 7,345,975 | B2 | * | 3/2008 | Fadeyev | G11B 3/70 |
| | | | | | 369/18 |
| 2003/0179364 | A1 | * | 9/2003 | Steenblik | G07D 7/206 |
| | | | | | 356/71 |
| 2003/0223100 | A1 | * | 12/2003 | Anderson | G11B 23/281 |
| | | | | | 359/3 |
| 2004/0125730 | A1 | * | 7/2004 | Yamamoto | G11B 7/24094 |
| 2005/0121416 | A1 | * | 6/2005 | Morishima | G11B 7/0045 |
| | | | | | 216/54 |
| 2005/0195705 | A1 | * | 9/2005 | Shin | G11B 7/0943 |
| | | | | | 369/44.37 |
| 2006/0077881 | A1 | | 4/2006 | Igi et al. | |
| 2006/0274637 | A1 | | 12/2006 | Abraham et al. | |
| 2007/0064545 | A1 | | 3/2007 | Carson et al. | |
| 2008/0291815 | A1 | | 11/2008 | Edwards | |
| 2012/0127843 | A1 | * | 5/2012 | Wang | G11B 7/28 |
| | | | | | 369/53.12 |
| 2013/0279318 | A1 | * | 10/2013 | Kotacka | G11B 7/24088 |
| | | | | | 369/112.03 |
| 2016/0322070 | A1 | * | 11/2016 | Wei | G11B 3/70 |
| 2017/0239972 | A1 | * | 8/2017 | Zhang | B42D 25/21 |
| 2021/0150296 | A1 | * | 5/2021 | Kagotani | G07D 7/12 |
| 2021/0168223 | A1 | * | 6/2021 | Sarikaya | H04L 69/04 |
| 2021/0209432 | A1 | * | 7/2021 | Houha | G06K 19/06065 |
| 2022/0260836 | A1 | * | 8/2022 | Chi | G02B 27/0081 |

OTHER PUBLICATIONS

International Searching Authority: International Search Report and Written Opinion, Intl. App. No. PCT/EP2019/071378 (dated Nov. 12, 2019).

Jonathan Ross Hologram Collection, "Mike Foster," (2015). Available from: https://web.archive.org/web/20150712102216/http://www.jrholocollection.com/index.php/mike-foster.

Discogs, "Ken Thorne—Superman II (Original Soundtrack)," Warner Bros. Records, (2022). Available from: https://www.discogs.com/release/22521734-Ken-Thorne-Superman-II-Original-Soundtrack.

Holophile Inc., "History," (2016). Available from: https://web.archive.org/web/20160305193921/http://holophile.com/html/history.htm.

* cited by examiner

GRAMOPHONE PLATE WITH RECORDED IMAGE

This application is the U.S. national phase entry of Intl. App. No. PCT/EP2019/071378 filed on Aug. 8, 2019, which claims priority from GB1813519.4 filed on Aug. 20, 2018. The entire contents of PCT/EP2019/071378 and GB1813519.4 are incorporated herein by reference.

TECHNICAL FIELD

This invention relates to a gramophone plate, more particularly to a gramophone plate on at least one face of which is recorded one or more images, especially visual images, in addition to audio data recorded thereon.

BACKGROUND AND PRIOR ART

As used herein, the term "gramophone plate" means any generally flat, planar or disc-like plate or body on which is recorded, on at least a portion of at least one face thereof, audio data, such as in the form of a continuous spiral groove of varying shape (e.g. varying width and/or depth and/or cross-sectional profile) passing along its length. Such plates may typically be formed from vinyl or similar plastics material. Such a modulated spiral groove, whose width and/or depth is/are typically dimensioned at the order of a few micrometers (microns) up to a few tens of micrometers (microns) (e.g. a width of around 80 micrometers (microns) on a typical vinyl LP gramophone plate), thus records audio data in the form of the modulations therein. Those modulations are mechanically readable by conventional stylus- or needle-based reading or playback apparatus such as is well-known in the field of conventional audio LPs or other audio recording plates or discs.

The principle of recording a visual image onto or into the surface of a gramophone plate by varying the surface relief of the plate material is well-known, but conventionally it has always been limited by the need for the area of the plate carrying the image to be separate from the area carrying the audio data record. The recorded image on the gramophone plate is typically placed either on one side only of the plate which does not contain any audio data recording, or else it is placed on the audio data record side of the plate but in one or more areas outside the area(s) containing the audio data record, for example within the inner ring at the centre of the plate or in a peripheral annular region radially outside the portion of the plate containing the audio data record.

There are two main reasons why hitherto such images have had to be so recorded separately from the audio data record:

Firstly, there are practical limitations of known technologies used for the actual recording of audio data on gramophone plates. This known technology is generally based on the mechanical cutting of an audio data log line into the recording medium by means of various electro-mechanical cutting devices, which are structurally highly specialized and designed solely for audio data recording whilst maintaining or optimizing required levels of quality of the audio data recorded. The cutting of data log lines is strictly linear and carried out without stopping or interrupting the cut process, and is carried out under force and speed conditions dependent on the recording medium, e.g. typically a lacquer layer or a copper layer, and so as to attain or comply with desired data recording parameters according to industry-wide standards. Typically, data log lines are cut with depths and/or widths with sizes of the order of around a few, e.g. up to a few tens of, micrometers (microns). Using known apparatus and techniques, there is no possibility of cutting an image parallel to an audio log line or to use a cutting device to cut an image separately in the space(s) between data log lines of the audio record.

Secondly, there is no known other technology that enables the straightforward yet accurate recording of a relief-type visual image exactly between audio data log lines, whilst maintaining reasonable image quality. The spaces between audio data log lines is typically of the order of a few, e.g. up to a few tens of, micrometers (microns). If one subtracts from this dimension even a slight separation space from each side edge of a given audio data log line with the aim of separating off a space from the cut audio log line, then the remaining area available is inadequate in width and too small for having formed therein a good quality image recording applied by conventional image recording techniques.

The present invention seeks to address the above shortcomings of the known art and enable visual images to be recorded on a surface of the body of a gramophone plate in area(s) substantially anywhere across the whole plate area, i.e. including in the spaces between audio data log lines, and substantially without detriment to the quality of the audio record.

SUMMARY OF THE INVENTION

Accordingly, in one aspect the present invention provides a gramophone plate having at least one face, the at least one face including at least one region on which is recorded audio data, wherein the said at least one region of the at least one face also has at least one visual image, or a portion of at least one visual image, recorded thereon.

In some embodiments, the at least one visual image (or portion thereof) may be recorded collectively in a plurality of surface portions of the said at least one region of the at least one face in between individual surface portions thereof on which are recorded the said audio data.

In some such embodiments, individual portions of the at least one visual image (or portion thereof) may be recorded in respective ones of a plurality of surface spaces between adjacent audio log lines in which are recorded the audio data on the said at least one region of the at least one face of the plate.

In many such embodiments, the spaces between adjacent audio data log lines, in which are recorded respective individual portions of the at least one visual image (or portion thereof), may typically have widths of from about 1 or 3 or 5 or 10 or 20 micrometres (microns) up to about 30 or 40 or 50 or 60 or 70 or 80 or 90 or 100 micrometers (microns).

In some embodiments, the gramophone plate may have two opposite faces, and the audio data and the at least one visual image (or portion thereof) may both be recorded in at least one region of one of those faces, whereby one of the faces of the plate comprises both audio data and the at least one visual image (or portion thereof) in at least one region thereof. In other embodiments, however, the audio data and the at least one visual image (or portion thereof) may both be recorded in at least one region of each of both of those faces, whereby both faces of the plate each comprise both audio data and at least one visual image (or portion thereof) in at least one respective region thereof.

In some embodiments, the audio data and the at least one visual image (or portion thereof) may be recorded in one region only of the or the respective face of the plate. Alternatively, in other embodiments the audio data and the at least visual image (or portion thereof), or optionally a respective portion of each of one or more visual images (or a respective portion thereof), may be recorded in each of a plurality of regions of the or the respective face of the plate.

In some embodiments, the or the respective face of the plate may further comprise at least one other region on which is not recorded audio data, and at least a portion of the said visual image may be recorded on the said at least one other region, whereby regions of the or the respective face of the plate on which are recorded the said visual image may comprise both recorded and unrecorded audio data regions.

In many embodiments, the at least one visual image (or portion thereof) may be recorded in the form of a or a respective optical relief pattern.

In some such embodiments, the optical relief pattern may comprise a diffractive relief pattern, especially a holographic relief pattern. Thus, in such embodiments the optical relief pattern may be or comprise one or more holograms.

However, in other such embodiments the optical relief pattern may comprise a non-diffractive, e.g. a refractive or other non-diffractive optically functional, relief pattern.

In many such embodiments, typical depths of the optical relief features that constitute the relief may be in the range of from about 0.1 or 0.5 or 1 or 2 or 3 or 4 or 5 or 10 nanometres up to about 0.1 or 0.5 or 1 or 2 or 3 or 4 or 5 or 10 or 20 micrometres (microns). Also, or alternatively, in many such embodiments, typical periods of the optical relief features that constitute the relief may be in the range of from about 10 or 20 or 30 or 40 or 50 nanometres up to about 10 or 20 or 30 or 40 or 50 or 100 or 200 or 300 micrometres (microns).

In another aspect the invention provides a method for the manufacture of a gramophone plate according to the first aspect of the invention or any embodiment thereof, the method comprising the steps of:

providing a gramophone plate having at least one face, the at least one face including at least one region having at least one visual image, or a portion of at least one visual image, recorded thereon; and recording audio data on the said at least one region of the at least one face.

In some embodiments of the above method the step of recording the audio data on the said at least one region of the at least one face may comprise cutting a substantially continuous spiral groove into the material of the plate to form audio data log lines therein that record the audio data. In some embodiments in which the at least one visual image (or portion thereof) is recorded in the form of a or a respective optical relief pattern, the said cutting may comprise cutting the said groove or audio data log lines through the optical relief of the recorded visual image (or portion thereof), especially through the optical relief and into the material of the plate therebeneath.

In practical embodiments, the said cutting may be carried out by means of any suitable known technique and/or apparatus for the cutting of audio data log lines in the form of a spiral groove for the purpose of recording audio data in gramophone plates.

In practising many embodiments of the invention, the provision of the gramophone plate having the at least one visual image, or a portion of at least one visual image, recorded on the at least one region of the at least one face, may comprise:

providing a gramophone plate having the at least one face; and recording on the at least one region of the face the said at least one visual image, or portion thereof.

Thus, in such preceding embodiments, the above-defined step of recording audio data on the said at least one region of the at least one face of the plate may be carried out subsequent to the step of recording on the at least one region of the face of the plate the said at least one visual image, or portion thereof.

However, in certain other alternative embodiments, it may be possible for the order of these two production steps to be reversed, namely so that the step of recording the said at least one visual image, or portion thereof, on the at least one region of the face of the plate may be carried out subsequent to the step of recording the audio data on the said at least one region of the at least one face of the plate.

Thus, in another, alternative, aspect the invention provides a method for the manufacture of a gramophone plate according to the first aspect of the invention or any embodiment thereof, the method comprising the steps of:

providing a gramophone plate having at least one face, the at least one face including at least one region having audio data recorded thereon; and then recording on the at least one region of the face at least one visual image, or a portion of at least one visual image.

In various embodiments the image recording step may comprise forming an optical relief pattern in the material of the plate, which relief pattern records or defines the said image, or portion thereof.

In practical examples of the above image recording step the formation of the optical relief pattern may be effected by means of any one or more of the following:

mechanical engraving,
optical recording,
chemical etching.

Other practical techniques may be used instead, if desired or appropriate, e.g. by means of other known technology able to form or record optical relief with dimensions and other parameters appropriate for forming the relief required, such as diffractive (e.g. especially holographic) relief and/or non-diffractive (e.g. refractive or gray-scale) relief.

In some practical embodiments, the recording of the at least one image, or portion thereof, may be effected by fine surface modification of the plate surface, e.g. by means of matte photo application, holographic image recording, and suchlike. Specific practical examples of such techniques are per se well known in the arts of photo printing and holographic printing. In many such embodiments the at least one image, or portion thereof, may be designed to be visible by the naked eye of a human observer, especially under normal or ambient lighting conditions. In certain embodiments, however, especially in the case of holographic images, the image may be designed to include hidden data, information or one or more sub-images, which may thus be designed to be readable or viewable by use of a corresponding dedicated reading device.

In practising some embodiments of the invention, in places where one or more portions of the recorded audio data record cross(es) or intersect(s) the already recorded visual image record, the image (or portion thereof) may be periodically interleaved by the audio data log lines, which may lead to a partial change of the original visual image record, but the overall recorded image (or portion thereof) may still be well visible without significant detriment to its character or clarity. Conversely, the e.g. optical relief of the image record may not significantly affect the quality of the audio data record, since the audio data is recorded primarily in the depth and width of the cut data log lines, rather than on the facial surface portions in between the audio logo lines where the image data is recorded.

In example embodiments of the invention the basic unrecorded gramophone plate may be formed, e.g. by moulding, cutting or pressing, from any suitable material, such as any of those materials already known in the art for the formation of gramophone plates for audio recording, e.g. a vinyl-based or other suitable plastics material.

In some typical embodiments, the e.g. optical relief pattern forming the recorded visual image (or portion thereof) on the surface of the gramophone plate may be spread substantially across the whole plate face, or only over a part or region of the plate face, so that at least one part of the image (or portion thereof) is recorded in an area or region external to or separated from that containing the audio data record and at least one other part of the image (or portion thereof) is recorded in an area or region which contains the audio data record.

If desired, in some embodiments the recorded visual image may create an original or unique visual aesthetic design for the gramophone plate. The design may be created by means of e.g. a static image or a hologram image. The visual image design may even contain one or more variable images that create kinetic optical effect(s) or a simple animation of a recorded image, when viewed appropriately.

In other embodiments, the e.g. optical relief pattern forming the recorded image (or portion thereof) on the surface of the gramophone plate may be limited so as to restrict the visual image (or portion thereof) to one or more selected area(s) or region(s) only on the plate surface. For instance, the visual image could be designed as a trade mark or trade logo, or perhaps some specific image with variable visual features, e.g. an optically variable holographic image. In such embodiments the visual image may even be applied as a security feature, such as for authenticating or identifying an original product. In the case of a holographic image, the image's design may even contain one or more covert or hidden image(s), e.g. which is/are readable only by use of a special reader for high-level inspection purposes.

At a practical commercial level, example embodiments of the invention may typically be practised using production steps and techniques that include the following sequence of production stages:
(i) Creation of a basic gramophone plate carrier with one or more portions or regions on at least one face surface thereof having optical relief formed thereon which records one or more portions of the desired visual image—e.g. typically carried out by mechanical press replication or heat replication or optical recording with or without a following etching process or mechanical engraving or chemical etching;
(ii) Cutting of audio data log lines, in the form of a substantially continuous spiral groove, through the optical relief of the recorded image(s)/image portion(s) into the plate carrier material;
(iii) Replication, e.g. by nickel galvanic replication, of the recorded visual image(s)/image portion(s) and the audio data log lines, optionally with
(iv) Embossing of plural gramophone plates, using an e.g. nickel shim, with the recorded visual image(s)/image portion(s) and the audio data log lines.

However, in some alternative example embodiments to those of the preceding paragraph, namely those in which the audio data recording and visual image recording/creation steps are reversed (so that audio data is recorded first and the visual image is recorded thereafter), corresponding example embodiments of the invention may be practised instead using production steps and techniques that include the following sequence of production stages:
(i) Creation of a basic gramophone plate carrier with one or more portions or regions on at least one face surface thereof having audio data log lines, in the form of a substantially continuous spiral groove, formed therein by cutting into the plate carrier material;
(ii) Recording on the at least one region of the face the said at least one visual image, or portion thereof, optionally in spaces between adjacent audio data log lines formed in step (i), wherein this image recording step comprises forming an optical relief pattern in the material of the plate, which relief pattern records or defines the said image, or portion thereof;
(iii) Replication of the recorded visual image(s)/image portion(s) and the audio data log lines, optionally with
(iv) Embossing of plural gramophone plates with the recorded visual image(s)/image portion(s) and the audio data log lines.

Using the above technology, it may be possible for the optical relief of the visual image(s)/image portion(s) to be applied so as to cover or extend over substantially the whole surface width or width region/area between adjacent audio log lines, i.e. substantially right up to the edges of audio log lines. Therefore, it may be desirable for the edges of audio log lines actually at the surface plane of the plate to be not exactly in-plane with the plate's surface plane, because of possible interference with the optical relief recording the visual image(s)/image portion(s), which could lead to a source of acoustic noise during reading/playback of the audio data. Therefore, to reduce or mitigate against this effect, the recorded optical relief of the visual image(s)/image portion(s) may be designed to be sufficiently fine and small-dimensioned in comparison with the mechanical dimensions of the cut audio log lines so as to prevent the recording of additional audio noise during the cutting of the audio log lines themselves, and further so as to prevent additional parasitic sound being created by a gramophone stylus or needle during reading/playback of the audio log lines.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Some embodiments of the invention will now be described in detail, by way of example only, with reference to the accompanying drawings, in which.

DETAILED DESCRIPTION OF EMBODIMENTS

Figure 1:
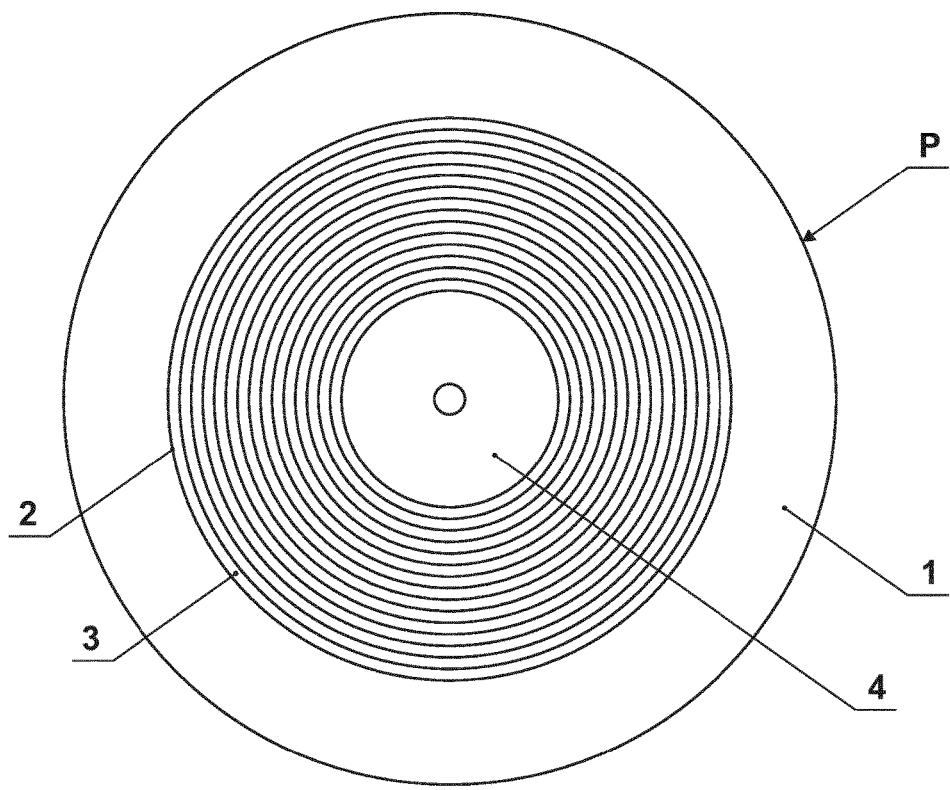
FIG. 1 is a schematic plan/face view of a conventional basic gramophone plate, showing the typical arrangement of its audio-data-recorded and -unrecorded regions.

Referring firstly to FIG. 1, here there is shown a conventional basic gramophone plate P, with an outer annular ring 1 and an inner circular hub area 4, both of which regions 1, 4 are substantially flat and planar without any audio data recorded thereon. In between the unrecorded regions 1, 4 is a central annular region bearing recorded audio data, in the form of a continuous spiral groove comprising audio data log lines 2 whose cut shape and profile record the audio data, which is readable and capable of playback using convention stylus- or needle-based gramophone playback equipment. Located between individual audio data log lines 2 are planar lands or spaces 3, which—according to the present invention—can be exploited to new and advantageous effect by recording thereon visual image data.

Figure 2:
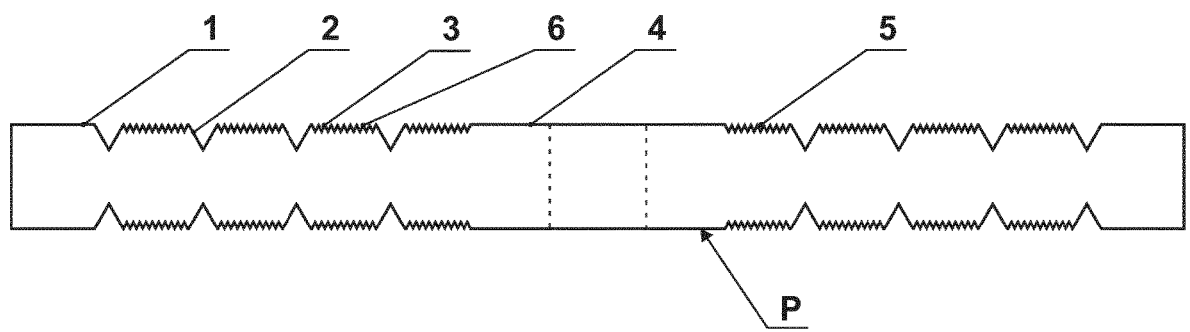
FIG. 2 is an enlarged schematic cross-sectional view of a gramophone plate according to one embodiment of the present invention, showing schematically the relative arrangement and configuration of its cut data log lines and optical relief defining one or more visual images/image portions.

FIG. 2 shows schematically an example of one such embodiment of the invention, in which interspersed between individual audio data log lines 2, on the lands or spaces 3 therebetween, are respective recorded portions of a visual image in the form of respective applied portions of optical relief 6. The optical relief is also applied in portions 5 extending into the area of the inner audio-unrecorded ring 4. The individual recorded optical relief portions 6, 5 collectively make up a complete visual image when viewed under normal viewing conditions. The relative width dimensions of the cut audio data log lines 2 and the scale of the optical relief itself being such that (i) the creation of the complete image from the individual visual image relief portions 6, 5 is substantially unaffected by the presence of the individual audio data log lines 2 between the individual relief portions 6, and (ii) the reading/playback of the recorded audio data from the audio data log lines 2 is substantially unaffected by the presence of the individual visual image relief portions 6 between the individual audio data log lines 2.

Figure 3:
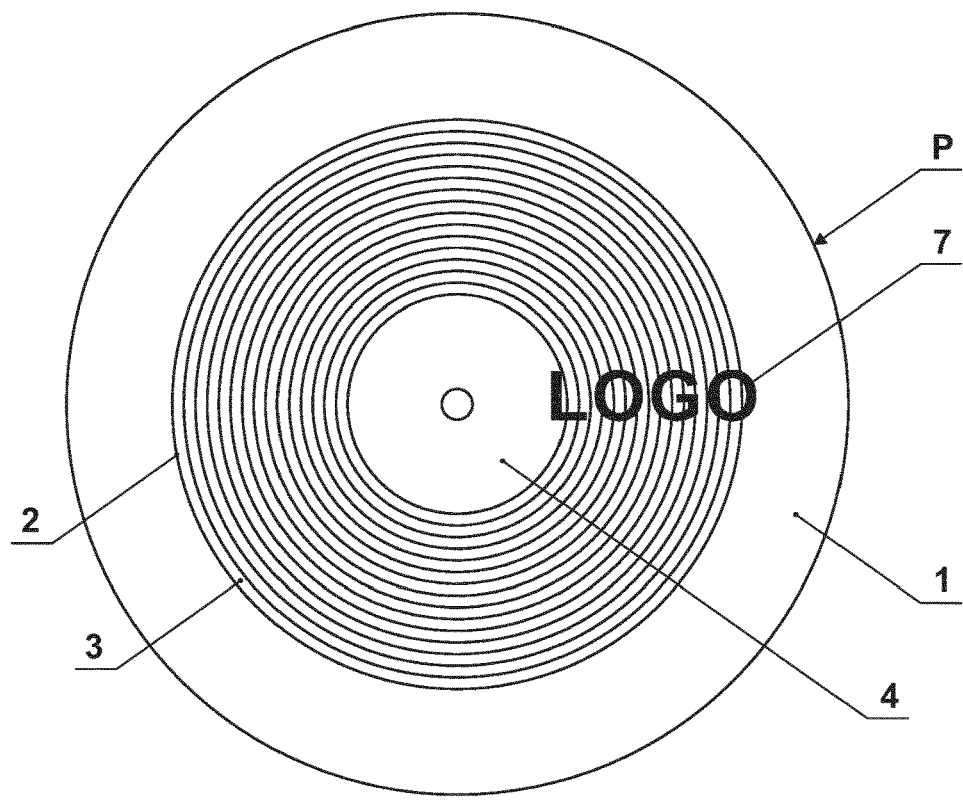
FIG. 3 is a schematic plan/face view of the embodiment gramophone plate of FIG. 2, showing schematically a security image recorded thereon and spanning both audio-data-recorded and -unrecorded regions of the plate.

FIG. 3 shows in plan/face view a practical example of the embodiment gramophone plate shown schematically in FIG. 2. As shown, the gramophone plate P comprises a recorded visual image 7 in the form of a logo recorded on the surface of the plate P, which logo image 7 is located partially within the inner ring region 4 of the plate P and partially across the main annular ring portion bearing the recorded audio data log lines 2. The recorded logo image 7 also extends a short distance into the outer audio-unrecorded annular ring 1. As is evident from the schematic representation of FIG. 2, the visual image 7 is made up of individual portions or sections of applied optical relief 6 each of which is recorded on a respective individual planar land or space 3 between the individual audio data log lines 2. By way of example, in this instance the recorded optical relief portions/sections 6 may be holographic relief, e.g. so as to form a visual security feature which, by appropriate design of the logo, may serve as an identification or authentication feature for the gramophone plate P.

Figure 4:
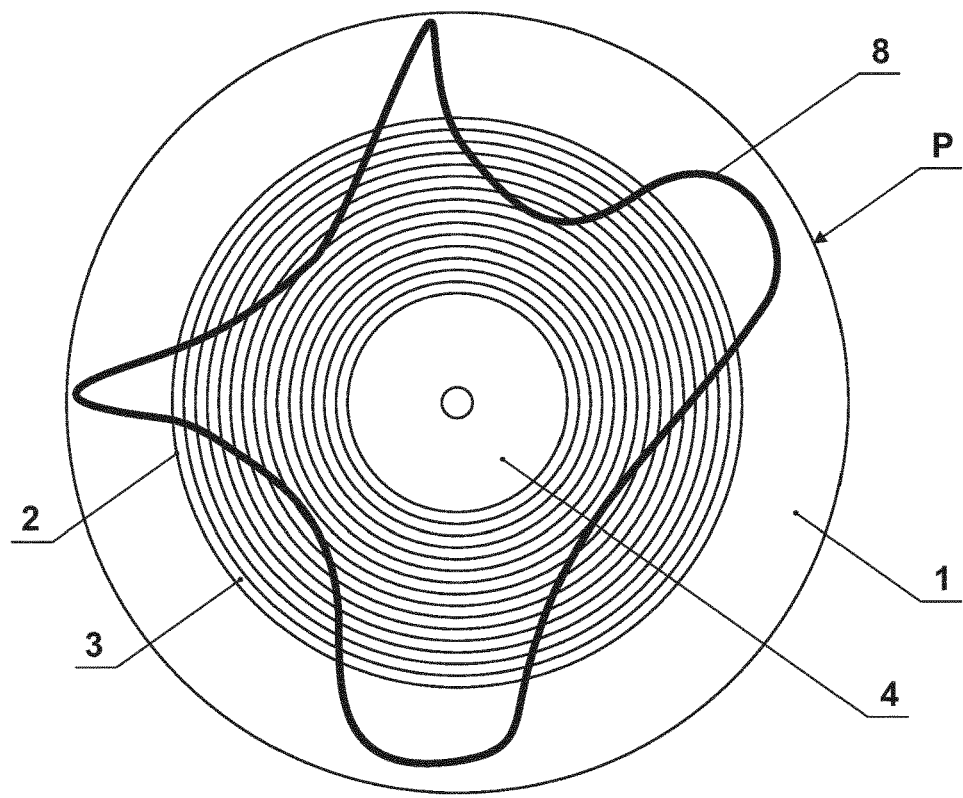
FIG. 4 is a schematic plan/face view of another embodiment gramophone plate according to the invention, showing schematically a decorative image recorded thereon and extending across substantially the whole of the face/side of the plate.

Referring now to FIG. 4, this shows another embodiment gramophone plate according to the invention, in which the area or region of the plate P containing the recorded visual image 8 spans substantially across the whole face or planar surface of the plate P, extending across the inner (audio-unrecorded) ring 4, across the central annular audio-recorded region containing the audio data log lines 2, right up to and overlapping with the radially outer (audio-unrecorded) ring 1. By way of example, in this instance the large overall visual image 8 may be static, and may for example be applied to the plate surface by chemical etching.

Alternatively, the individual portions/sections collectively making up the overall visual image 8 could be applied by a combination of plural different holographic relief application techniques, in order to offer the possibility of designing the image 8 so as to include kinetic effect(s) therein. In that case, the image 8 could for instance be designed to change in appearance with movement of the plate P under appropriate illumination, e.g. upon rotation of the plate P itself during playback thereof.

Numerous other individual visual image recording configurations, arrangements, layouts, combinations and viewing types may possibly be employed in other embodiment gramophone plates within the scope of the invention, the embodiments shown in FIGS. 2, 3 and 4 being just a few representative illustrative explanatory examples.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. A gramophone plate having at least one face, the at least one face including at least one region on which is recorded audio data in the form of audio data log lines,
   wherein:
   the at least one region of the at least one face on which is recorded the audio data also has at least one visual image or a portion of at least one visual image recorded thereon;
   the at least one visual image or the portion of the at least one visual image is recorded in the form of a holographic diffractive optical relief pattern;
   individual portions of the at least one visual image or the portion of the at least one visual image are recorded in respective ones of a plurality of surface spaces between adjacent ones of the audio data log lines in which are recorded the audio data on the at least one region of the at least one face of the gramophone plate; and
   the holographic diffractive optical relief pattern recording the individual portions of the at least one visual image or the portion of the at least one visual image is applied so as to cover or extend over substantially the whole surface width of the spaces between adjacent ones of the audio data log lines.

2. The gramophone plate according to claim 1, wherein the at least one visual image or the portion of the at least one visual image is recorded collectively in a plurality of surface portions of the at least one region of the at least one face in between individual surface portions thereof on which are recorded the audio data.

3. The gramophone plate according to claim 1, wherein the surface spaces between adjacent ones of the audio data log lines, in which are recorded respective individual portions of the at least one visual image or the portion of the at least one visual image, have widths of from 1 or 3 or 5 or 10 or 20 micrometres (microns) up to about 30 or 40 or 50 or 60 or 70 or 80 or 90 or 100 micrometers (microns).

4. The gramophone plate according to claim 1, wherein the gramophone plate has two opposite faces, and either:
(i) the audio data and the at least one visual image or the portion of the at least one visual image are both recorded in at least one region of one of the two opposite faces, whereby one of the two opposite faces of the gramophone plate comprises both audio data and the at least one visual image or the portion of the at least one visual image in at least one region thereof; or
(ii) the audio data and the at least one visual image or portion of the at least one visual image are both recorded in at least one region of each of both of the two opposite faces, whereby both of the two opposite faces of the gramophone plate each comprise both audio data and the at least one visual image or the portion of the at least one visual image in at least one respective region thereof.

5. The gramophone plate according to claim 1, wherein either:
(i) the audio data and the at least one visual image or the portion of the at least one visual image are recorded in one region only of the at least one face of the gramophone plate; or
(ii) the audio data and the at least one visual image or the portion of the at least one visual image or each of one or more visual images or a portion of each one of the one or more visual images are recorded in each of a plurality of regions of the at least one face of the gramophone plate.

6. The gramophone plate according to claim 1, wherein the at least one face of the gramophone plate further comprises at least one other region on which is not recorded audio data,
wherein:
at least a portion of the visual image is recorded on the at least one other region; and
regions of the at least one face of the gramophone plate on which are recorded the visual image comprise both recorded and unrecorded audio data regions.

7. The gramophone plate according to claim 1, wherein:
(i) depths of optical relief features that constitute the diffractive optical relief pattern are in the range of from 0.1 or 0.5 or 1 or 2 or 3 or 4 or 5 or 10 nanometres up to 0.1 or 0.5 or 1 or 2 or 3 or 4 or 5 or 10 or 20 micrometres (microns); or
(ii) periods of the optical relief features that constitute the diffractive optical relief are in the range of from 10 or 20 or 30 or 40 or 50 nanometres up to 10 or 20 or 30 or 40 or 50 or 100 or 200 or 300 micrometres (microns); or
(iii) both (i) and (ii) above are present or satisfied.

8. A method for the manufacture of a gramophone plate comprising the steps of:
providing a gramophone plate having at least one face, the at least one face including at least one region having at least one visual image or a portion of the at least one visual image recorded thereon in the form of a holographic diffractive optical relief pattern; and
recording audio data on the at least one region of the at least one face by cutting of audio data log lines through the diffractive optical relief,
wherein the holographic diffractive optical relief, recording the at least one visual image or the portion of the at least one visual image, is recorded in spaces between adjacent ones of the audio data log lines and applied so as to cover or extend over substantially the whole surface width of the spaces between adjacent ones of the audio data log lines.

9. The method according to claim 8, wherein the step of recording the audio data on the at least one region of the at least one face comprises a step of cutting a substantially continuous spiral groove into a material of the gramophone plate to form the audio data log lines therein that record the audio data.

10. The method according to claim 9, wherein the step of cutting comprises cutting the groove through the holographic diffractive optical relief forming the at least one visual image or the portion of the at least one visual image and into the material of the gramophone plate therebeneath.

11. The method according to claim 8, further comprising recording on the at least one region of the at least one face the at least one visual image or the portion of the at least one visual image.

12. The method according to claim 8, wherein:
the step of recording the at least one visual image or the portion of the at least one visual image comprises forming the holographic diffractive optical relief pattern in a material of the gramophone plate, and
the holographic diffractive optical relief pattern records or defines the at least one visual image or the portion of the at least one visual image.

13. The method according to claim 8, further comprising a sequence of production stages, comprising:
(i) creation of a basic gramophone plate carrier with one or more portions or regions on at least one face surface thereof having a holographic diffractive optical relief formed thereon, which records one or more portions of the at least one visual image;
(ii) cutting of the audio data log lines, in the form of a substantially continuous spiral groove, through the holographic diffractive optical relief of recorded at least one visual image or portion of the at least one visual image into a plate carrier material;
(iii) replication of the recorded at least one visual image or portion of the at least one visual image and the audio data log lines; and
(iv) embossing of a plurality of gramophone plates with the recorded at least one visual image or portion of the at least one visual image and the audio data log lines.

14. A method for the manufacture of a gramophone plate comprising steps of:
providing a gramophone plate having at least one face, the at least one face including at least one region having audio data recorded thereon in the form of audio data log lines; and
recording on the at least one region of the at least one face at least one visual image or a portion of the at least one visual image in the form of a holographic diffractive optical relief pattern applied in spaces between adjacent ones of the audio data log lines and so as to cover or extend over substantially the whole surface width of the spaces between adjacent ones of the audio data log lines.

15. The method according to claim 14, further comprising a sequence of production stages, comprising:
(i) creation of a basic gramophone plate carrier with one or more portions or regions on at least one face surface thereof having the audio data log lines, in the form of a substantially continuous spiral groove, formed therein by cutting into a plate carrier material;
(ii) recording on the at least one region of the face the at least one visual image or the portion of the at least one visual image in spaces between adjacent ones of the audio data log lines formed in step (i), wherein an image recording step comprises forming the holographic diffractive optical relief pattern in the plate carrier material, in which the holographic diffractive optical relief pattern records or defines the at least one visual image or the portion of the at least one visual image;
(iii) replication of a recorded at least one visual image or at least a portion of the at least one visual image and the audio data log lines; and
(iv) embossing of a plurality of gramophone plates with the recorded at least one visual image or a portion of the at least one visual image and the audio data log lines.

* * * * *